US006405156B1

(12) United States Patent
Kern et al.

(10) Patent No.: US 6,405,156 B1
(45) Date of Patent: Jun. 11, 2002

(54) METHOD FOR PLANNING, CONSTRUCTING AND/OR MAINTAINING A PIPELINE SYSTEM AND DATA PROCESSING SYSTEM THEREFOR

(75) Inventors: Reinhard Kern, Forchheim; Ernst-Eckhardt Pöschel, Erlangen; Manfred Ziegerer, Nürnberg; Ruth-Margarete Bickel, Erlangen; Erwin Rusitschka, Weisendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/231,502

(22) Filed: Jan. 14, 1999

(30) Foreign Application Priority Data

Jan. 14, 1998 (EP) .............................. 98100561

(51) Int. Cl.[7] .............................. G06F 17/50
(52) U.S. Cl. .................. 703/1; 703/6; 700/115
(58) Field of Search ............ 703/1, 2, 6; 700/115–118; 705/400

(56) References Cited

U.S. PATENT DOCUMENTS

| 5,491,637 | A | * | 2/1996 | Kraemer et al. ............ 700/115 |
| 5,517,428 | A | | 5/1996 | Williams ........................ 703/1 |
| 5,768,149 | A | * | 6/1998 | Umney et al. .................. 703/1 |
| 5,920,849 | A | * | 7/1999 | Broughton et al. ......... 705/400 |
| 6,041,171 | A | * | 3/2000 | Blaisdell et al. ................ 703/6 |

FOREIGN PATENT DOCUMENTS

EP      0696775 A1   2/1996

OTHER PUBLICATIONS

Parkinson, "New Data Center Provides Common Terms for Plant Components", Chemical Engineering, vol. 104 Issue 3, p. 21 (Mar. 1997).*
Bornt, "Spreadsheets Cut Calculation Time for Piping System Design", Power Engineering, vol. 97 Issue 3, pp. 38–39 (Mar. 1993).*
"Projektierung des EPR", Reinhard Kern, ATW–International Review of Nuclear Energy, 42$^{nd}$ year, 1997, Issue 10, Oct., pp. 616–618.
"Dubbel–Taschenbuch für den Maschinenbau", Springer Verlag, 1995, 18$^{th}$ Edition.

* cited by examiner

Primary Examiner—Kevin J. Teska
Assistant Examiner—Samuel Broda
(74) Attorney, Agent, or Firm—Laurence A. Greenberg; Werner H. Stemer; Ralph E. Locher

(57) ABSTRACT

A method for planning, constructing and/or maintaining a pipeline system having a plurality of line sections, includes storing material data, for example, in a first memory, and storing data relating to pipe components in a second memory. A material may be selected, using the two memories, from line parameters assigned to a line section, a maximum permissible transversal stress is determined, an external diameter is selected and a minimum wall thickness is determined. The next largest wall thickness of an available pipe component is specified. A uniquely defined pipe class is generated for the line section from the line parameters, the material and the next largest wall thickness. The pipe class which is preferably generated by an EDP system in an automated manner permits a selective and error-free selection of a pipe component which is to be installed in the line section. A data processing system for carrying out the method is also provided.

16 Claims, 3 Drawing Sheets

METHOD FOR PLANNING, CONSTRUCTING AND/OR MAINTAINING A PIPELINE SYSTEM AND DATA PROCESSING SYSTEM THEREFOR

BACKGROUND OF THE INVENTION

Field of the Invention

The invention is concerned with the field of planning, constructing and/or maintaining pipeline systems, in particular extensive and wide-ranging pipeline systems.

The invention relates to a method for planning and/or constructing and/or maintaining a pipeline system, in particular in a power plant, having a plurality of line sections each assigned a set of line parameters including, in particular, a maximum permissible pressure, a maximum permissible temperature and a rated diameter. The invention also relates to a data processing system.

Large technical systems frequently include very extensive, wide-ranging and complicated pipeline systems. Different line parameters are frequently assigned to the individual line sections of such a pipeline system. Such line parameters are, in particular, structural parameters and include, for example, a maximum permissible pressure, a maximum permissible temperature and a rated diameter. Then, the only pipe components installed in the line section must be ones having a physical stress limit that lies above the respective structural parameter.

In a technical article entitled "Projektierung des EPR [EPR Planning and Design]" in ATW-International Review of Nuclear Energy, 42nd year (1997), Issue 10—October, pp. 616 to 618, a method is described for fulfilling technical system requirements in the planning of pipe components. In that method the maximum bending radius, the external diameter and the wall thickness of the sections of pipe are determined automatically on the basis of pipeline input values, a control catalog and pipe classes corresponding automatically to a "boiler formula".

In a book entitled "Dubbel-Taschenbuch für den Maschinenbau [Dubbel's Mechanical Engineering Manual]", Springer Verlag, 1995, 18th Edition, a formula which can be used, inter alia, to calculate a necessary wall thickness from, inter alia, a calculated pressure and an external diameter of a pipe, is given on page K6.

For example, in a newly developed pressurized water reactor, the European Pressurized-water Reactor (EPR), a total of approximately 17,000 sections of pipe with a length of approximately 150 km and with a magnitude on the order of 10,000 pipe components are to be assumed in a reconstructed area alone. During the planning, construction and/or maintenance of such an extensive plant it is easy for errors to occur and the elimination thereof could entail additional costs or a delay. For example, two adjacent pipe components which are associated with a common section of pipe may have different or excessively low loading limits although uniform and/or relatively high structural parameters were provided for the section of pipe. Such an error, that is picked out by way of example from many thousands of possible errors, should be avoided from the outset, additionally in view of the completed safety technology which has been strived for at the EPR. Then the error does not have to be eliminated after a test run or a functional check before the reactor is started up, which would be cost-intensive or time-intensive.

SUMMARY OF THE INVENTION

It is accordingly an object of the invention to provide a method for optimizing, speeding up and/or simplifying the planning, constructing and/or maintenance of a pipeline system and a data processing system therefor, which overcome the hereinafore-mentioned disadvantages of the heretofore-known methods and systems of this general type and with which a targeted production or renewal of a line section becomes possible without the possibility of errors occurring in the process.

With the foregoing and other objects in view there is provided, in accordance with the invention, a method for planning and/or constructing and/or maintaining a pipeline system, in particular in a power plant, which comprises assigning a set of line parameters including, in particular, a maximum permissible pressure, a maximum permissible temperature and a rated diameter, to each of a plurality of line sections in a pipeline system; on the basis of a selected set of the line parameters for a line section to be produced or renewed, specifying a material and a wall thickness of an available pipe component sufficient for loading in accordance with the selected set of the line parameters; and generating therefrom a pipe class uniquely defined for the line section, for identifying a sufficiently loadable pipe component for the line section using the pipe class.

The method is based, inter alia, on the fact that it is possible to produce or renew a line section in a targeted, largely error-free manner only if the line section is assigned a pipe class which, on one hand, combines a plurality of similar line sections, i.e. line sections with similar line parameters, and, on the other hand, permits an uniquely defined identification and/or selection of a pipe component. The assignment must take place by taking line parameters, one or more material characteristic variables and one or more pipe component dimensions into account.

The method therefore serves, for example, as a quality-assurance aid for an engineer, fitter or service technician who has to install a new pipe component or a replacement pipe component into a line section.

In accordance with another mode of the invention, the pipe class is generated by virtue of the fact that in each case a strength value and a use priority are assigned to at least one material in a first memory, the external diameter and wall thicknesses of available pipe components are stored in a second memory, and on the basis of the selected set of line parameters for the line section which is to be produced or renewed:

a) the material is specified by virtue of the fact that a material with the highest use priority and the strength value which is assigned to this material are selected from the first memory, b) the maximum permissible transversal stress is determined for the material, c) an external diameter is selected from the second memory, d) a minimum wall thickness is determined from the external diameter and the transversal stress, e) the wall thickness is specified by virtue of the fact that the next largest wall thickness of an available pipe component is determined from the second memory using the material and the minimum wall thickness, and f) the pipe class which is uniquely defined for the line section is generated from the selected set of line parameters, the material and the next largest wall thickness.

Through the use of the rule provided according to this embodiment, the assignment, i.e. generation, of the pipe class to the line section is possible in a particularly easy, quick and reliable manner.

The generation of the pipe class and/or of a designation or of a code name for the pipe class, can be carried out, for example, by virtue of the fact that initial letters, abbreviations, code numbers and/or numerical values for the material, the line parameters and/or the next largest wall thickness which is specified are combined to form a pipe class designation.

Instead of the transversal stress, it is also possible, if appropriate, to use a different mechanical stress.

An available pipe component may, for example, be a pipe, in particular a linear pipe, a bent pipe (pipe bend, L element), a branch element (T element), a reducing element or a fitting.

The method is preferably carried out by using an electronic data processing system or a computer. The first and/or second memory is then part of the data processing system or a component of a larger magnetic, optical or electronic memory associated with the data processing system.

The first and/or second memory is preferably implemented in the form of one or more tables in the data processing system.

The use of an electronic data processing system for carrying out the method provides the additional advantage of ensuring that the method can be carried out in a largely automated manner without the involvement of human intelligence. This is advantageous particularly in the planning, construction and/or maintenance of very large and extensive pipeline systems, since errors very easily arise when the method is carried out manually by planning or servicing personnel. In terms of improved quality assurance, the use of an electronic data processing system for carrying out the method is to be preferred over the involvement of human intelligence.

The line parameter sets which are respectively assigned to the line sections can either be entered into the data processing system manually through the use of a data input unit or output from a parameter memory in which the line parameters have previously been stored.

The strength value which is assigned to a material may, for example, be a value for the tensile strength (tearing strength) and/or for the start of flowing (yield point). In particular, in each case a plurality of strength values may be assigned to the material as a function of the temperature.

One or more safety coefficients may be assigned to the material solely, or additionally.

The maximum permissible transversal stress is determined, for example, as a minimum from a first quotient and a second quotient. The first quotient is formed from the tensile strength divided by a first safety coefficient, and the second quotient is formed from the tensile yield strength divided by a second safety coefficient.

In accordance with a further mode of the invention, the minimum wall thickness $t_{min}$ is determined by using the formula:

$$t_{min} = \frac{p_A \cdot D_A}{2 \cdot \sigma_{perm} \cdot l_f + p_A} + A.$$

In this case, reference symbol $p_A$ designates the maximum permissible pressure in the line section which is to be produced or renewed. Reference symbols $D_A$, $\sigma_{perm}$, $l_f$ and A stand for the external diameter which has been specified, the maximum permissible transversal stress which has been determined, a longitudinal factor (coefficient of weakening) and a sum of the tolerances which occur (wall thickness supplement).

The formula is preferably evaluated with the aid of a computer. The calculation of the minimum wall thickness, with the aid of a computer, provides the advantage of a precise, continuous and uninterrupted calculation. This is in comparison with a procedure in which constant approximated values for minimum wall thicknesses within specified pressure and temperature intervals are provided in a table and in which an approximated value is read out from the table for a specific temperature and a specific pressure, in order to specify the minimum wall thickness for the line section which is to be produced or renewed. During the precise calculation, a situation in which an unnecessarily enlarged wall thickness is determined as a result of the approximated value is avoided.

In accordance with an added mode of the invention, the component codes for pipe components are stored, ordered according to pipe classes, in a pipe component memory. As a result, the access to a specific pipe component is simplified and speeded up further after a pipe class has been generated, in particular in a largely automated manner in an electronic data processing system, for a line section which is to be renewed or produced.

In accordance with an additional mode of the invention, the pipe classes which are stored in the pipe component memory are regenerated in a uniquely defined way from one or more sets of line parameters, and each pipe component is assigned at least one pipe class.

Through the use of its component code, a pipe component can be ordered in the pipe component memory, in particular under a plurality of pipe classes, and stored.

In accordance with again another mode of the invention, either the pipe class is entered as a new pipe class in the pipe component memory, if that pipe class which has been generated for the selected set of line parameters did not yet exist in the pipe component memory, and a component code of a pipe component which is composed of the specified material and has the specified wall thickness is defined and assigned to this pipe class, or, if the pipe class which has been generated for the selected set of line parameters already existed, a component code which has been stored under this pipe class is selected from the pipe component memory.

This development shows, in particular, that if the pipe class which has been generated for the selected set of line parameters does not yet exist in the pipe component memory, the method operates in a type of learning or build-up mode during which the pipe component memory is gradually built up, i.e. filled with assignments of a component code to form a pipe class. In this learning mode, a component code must also be defined for the pipe component, for which purpose, for example, in the case of the execution of the method through the use of an electronic data processing system, it is possible to provide a software-controlled user input. The program also operates in a type of execution mode if the pipe class which has been generated for the selected set of line parameters already existed. In this case, the data which have been stored in the pipe component memory during the learning mode, for example, are used.

In accordance with again a further mode of the invention, the component code which has either been selected in the execution mode or defined in the learning mode is used, for example, to actuate an automated storage facility which contains pipe components.

As a result, an advantage is obtained which is that the entire process proceeds in a largely automated manner starting from a selected set of line parameters for a line section which is to be produced or renewed and ending with the physical presence of a pipe component at the fitter's. This occurs without the involvement of human intelligence, especially if the method operates particularly in the execution mode.

In accordance with again an added feature of the invention, the line section which is to be produced or renewed is produced or renewed by using the pipe component that is associated with the selected and/or defined component code.

The method of generating the pipe class according to the invention advantageously ensures that the pipe component is installed in the line section only if it has the same pipe class as that section, and the installation is thus permissible in terms of the maximum expected loading. A pipe class is namely assigned to a line section in a uniquely defined manner according to the method.

The fact that, as described above, one and the same pipe component can be ordered and stored in the pipe component memory under a plurality of pipe classes by virtue of its component code, permits the pipe component, if appropriate, to also be installed in various line sections, in particular in line sections with different pipe classes and thus greatly varying line parameters. However, in the execution of the generation of a pipe class according to the method of the invention, it is ensured in every case that only a sufficiently loadable pipe component is installed.

In accordance with again an additional mode of the invention, the line parameter sets which are respectively assigned to the line sections include, in addition to a maximum permissible pressure, a maximum permissible temperature and a rated diameter, a material type and/or a safety level. The material type may, for example, be a generic term for a plurality of materials. For example, the material type may be "stainless steel", "austenitic steel", "rust-free steel" or "non-ferrous metal". The safety level may, for example, contain an item of information indicating how much smaller the maximum permitted transversal stress must be than the strength value assigned to the material. In this case, the safety level contains, as it were, a safety margin which the line section that is to be produced or renewed must have.

In accordance with yet another mode of the invention, a smallest permitted bending radius for the selected pipe component is calculated from the minimum wall thickness which is determined and from the minimum wall-thickness comparison values which are stored. As a result, an additional advantage which is obtained is that when the pipe component that is associated with the component code is installed in the line section, the fitter or installer is provided with the additional information as to how strongly he or she may bend the pipe component, in particular a linear, bent or branched pipe.

In accordance with yet a further mode of the invention, the pipe class which is generated and/or the external diameter which is specified and/or the wall thickness which is specified, are displayed together with the smallest permitted bending radius, on a visual display unit.

In accordance with yet an added mode of the invention, a plurality of alternative materials are taken into account in the generation of the pipe class.

In accordance with yet an additional mode of the invention, initially, for example in method step a), a plurality of materials are selected for which, for example up to method step d), in each case a minimum wall thickness is determined, and that one of these materials which gives rise to the smallest wall thickness is then selected and used as the basis for the further calculation, for example in method steps e) and f).

As a result, it is advantageously ensured, for example, that a higher quality material for which a smaller wall thickness is determined is selected. Under certain circumstances, that can give rise to a saving in terms of material and/or costs.

With the objects of the invention in view there is also provided a data processing system, into which a program for carrying out the method, in particular with its refinements and developments, is loaded.

Other features which are considered as characteristic for the invention are set forth in the appended claims.

Although the invention is illustrated and described herein as embodied in a method for planning, constructing and/or maintaining a pipeline system and a data processing system therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
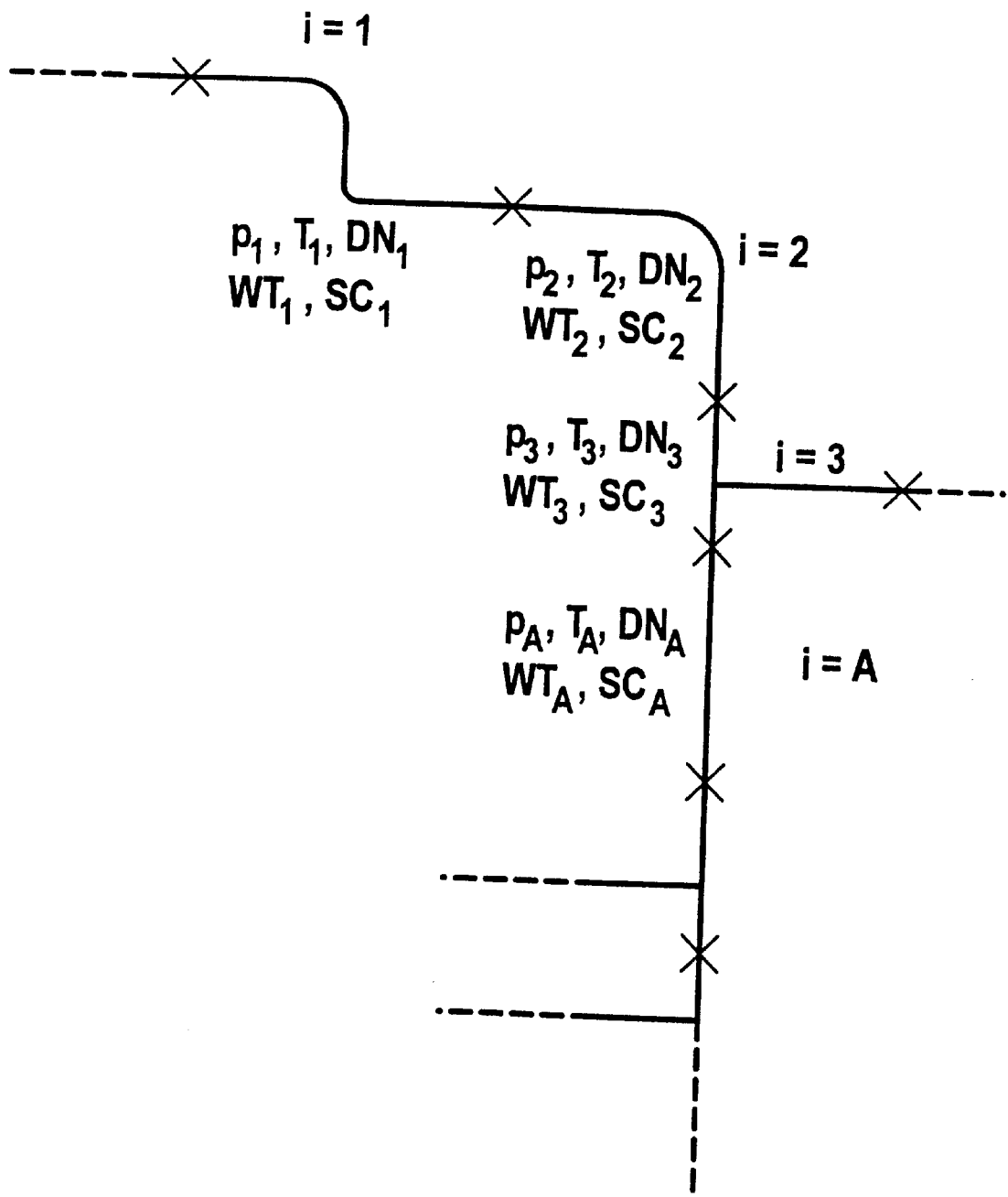
FIG. 1 is a fragmentary, diagrammatic, plan view of a portion of a pipeline system.

Referring now to the figures of the drawings in detail and first, particularly, to FIG. 1 thereof, there is seen a pipeline system which is composed of a plurality of line sections $i=1,2,\ldots$. The line sections are each assigned a set of known line parameters, which set includes a maximum permissible pressure $p_i$, a maximum permissible temperature $T_i$, a rated diameter $DN_i$, a material type $WT_i$ and a safety level $SC_i$. In the case of the following considerations it is assumed that the intention is to produce a line section $i=A$ in the pipeline system and to install there a pipe component which is adequate for the loading that occurs in the line section in accordance with the line parameters.

Figure 2:
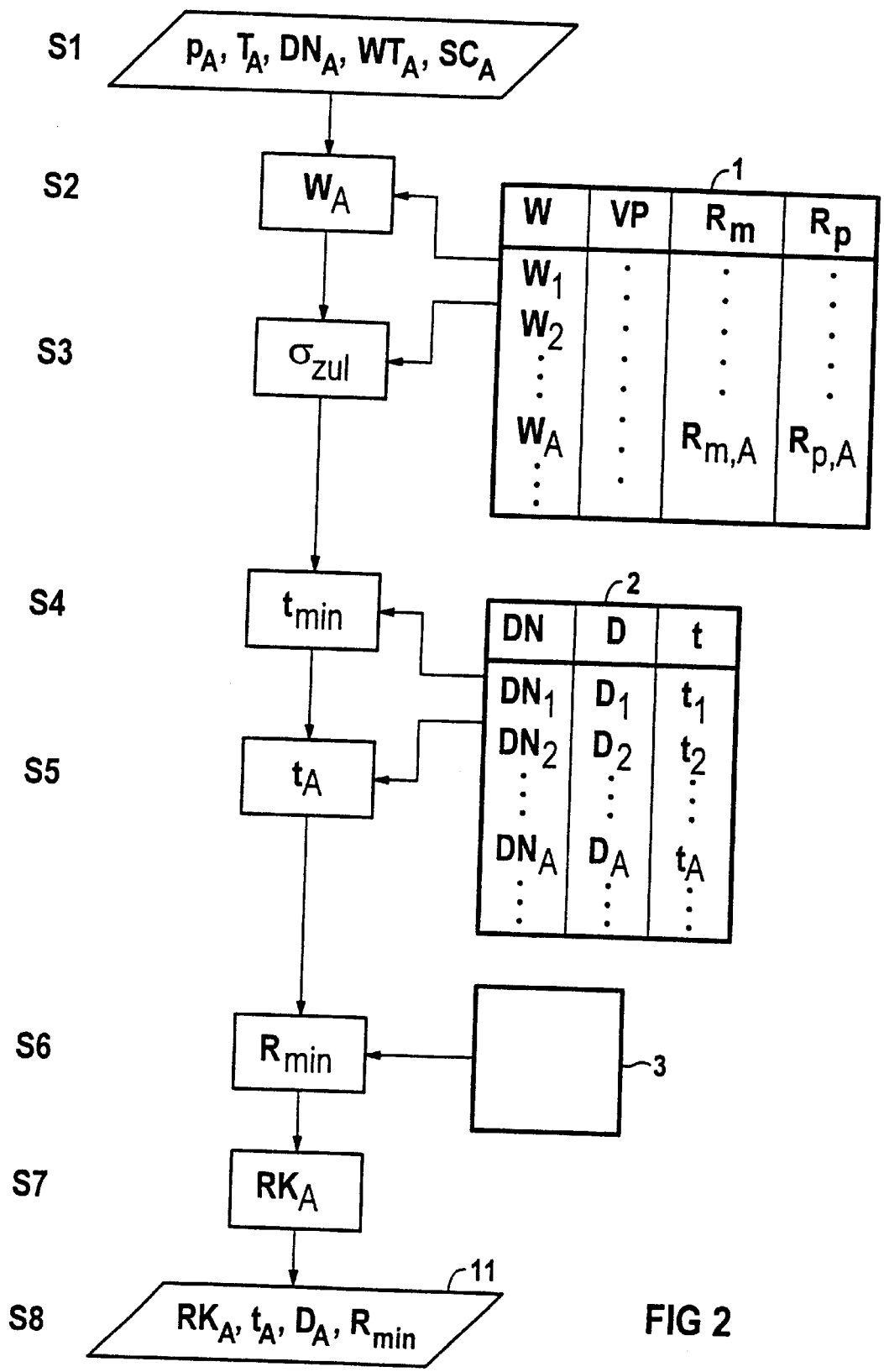
FIG. 2 is a flow chart showing a highly simplified sequence of a method which generates a pipe class.

An example of a method according to the invention which is illustrated in FIG. 2 starts in a first step S1 with the input or entering of a set of line parameters which is assigned to the line section that is to be produced or renewed. The set includes a maximum permissible pressure $p_A$, a maximum permissible temperature $T_A$, a rated diameter DNA, a material type $WT_A$ and a safety level $SC_A$. The material type $WT_A$ describes, for example, a corrosion property, for example "rust-proof steel", or a group of materials, for example "austenitic steel" or "ferritic steel". The safety level $SC_A$ is distinguished by a safety factor (safety coefficient).

In a first memory 1, various materials $W_1$, $W_2$, . . . are each assigned a use priority VP and strength values, in particular a tensile strength $R_m$ and a yield point $R_p$, for example a 0.2% yield point $R_{p0.2}$. The first memory 1 is implemented by EDP technology in the form of one or more logically linked tables.

In a second step S2, a material WA with the highest use priority VP, and the strength values $R_{m,A}$ and $R_{p,A}$ assigned to the material $W_A$, are selected from the first memory 1.

In a following, third step S3, the tensile strength $R_{m,A}$ and the yield point $R_{p,A}$ are each divided by a value which designates the safety level $SC_A$. The minimum of the two quotients provides a maximum permissible transversal stress $\sigma_{perm}$ according to the following equation:

$$\sigma_{perm} = \min\left(\frac{R_m, A}{SC_A}, \frac{R_p, A}{SC_A}\right).$$

A second memory 2 stores the rated diameter $DN_1$, $DN_2$, . . . , an external diameter $D_1$, $D_2$, . . . and wall thicknesses $t_1$, $t_2$, . . . for available pipe components. In this case, the same external diameter D can be assigned to various rated diameters DN. In any case, the second memory 2 makes it possible to specify an external diameter $D_A$ which is associated with a rated diameter $DN_A$. The second memory 2 is implemented through the use of EDP technology in the form of one or more logically linked tables.

Available pipe components are, for example, pipe components which are generally commercially available, in particular those which have a standard diameter and a standard wall thickness, or pipe components which are stored, or kept in stock, in a pipe component storage facility.

In a fourth step S4, a minimum wall thickness $t_{min}$ is determined from the external diameter $D_A$ and the transversal stress $\sigma_{perm}$ using the formula:

$$t_{min} = \frac{p_A \cdot D_A}{2 \cdot \sigma_{perm} \cdot l_f + p_A} + A$$

wherein $l_f$ and A designate a longitudinal factor and a sum of the (maximum) tolerances which occur in the line section and the pipe components.

In addition to this minimum wall thickness $t_{min}$ which is determined, the next largest wall thickness $t_A$ of an available pipe component is specified from the second memory 2, as a fifth step S5.

Minimum wall-thickness comparison values, for example ISO standard values, are stored in a third memory 3. A smallest permitted bending radius $R_{min}$ for the selected pipe component is calculated in a sixth step S6 by comparing the determined, minimum wall thickness $t_{min}$ with the stored, minimum wall-thickness comparison values.

In a seventh step S7 a pipe class $RK_A$ which is uniquely defined for the line section is generated from the selected set of line parameters $p_A$, $T_A$, $DN_A$, the material $W_A$ and the next largest wall thickness $t_A$. Numerical values or code numbers for the set of line parameters $P_A$, $T_A$, $DN_A$, $WT_A$, $SC_A$, the material $W_A$ and the wall thickness $t_A$, are combined to form a code name for the pipe class $RK_A$.

In the simplest case, exclusively the data which are relevant for the loading of the pipe component, such as the wall thickness $t_A$ and material $W_A$, are contained in the code name. Then, in addition, it is necessary, for the uniquely defined identification of a pipe component, to have an indication of a rated diameter $DN_A$ and of a component type, for example linear pipe, pipe bend or the like. However, the rated diameter $DN_A$ and the component type can also be a component of the code name of the pipe class $RK_A$ in a more wide-ranging embodiment of the method.

The method example which is illustrated in FIG. 2 ends with an eighth step S8 in which the pipe class $RK_A$ that is generated, the external diameter $D_A$ which is specified, the wall thickness $t_A$ that is specified and the smallest permitted bending radius $R_{min}$ are displayed on a visual display unit 11.

Figure 3:
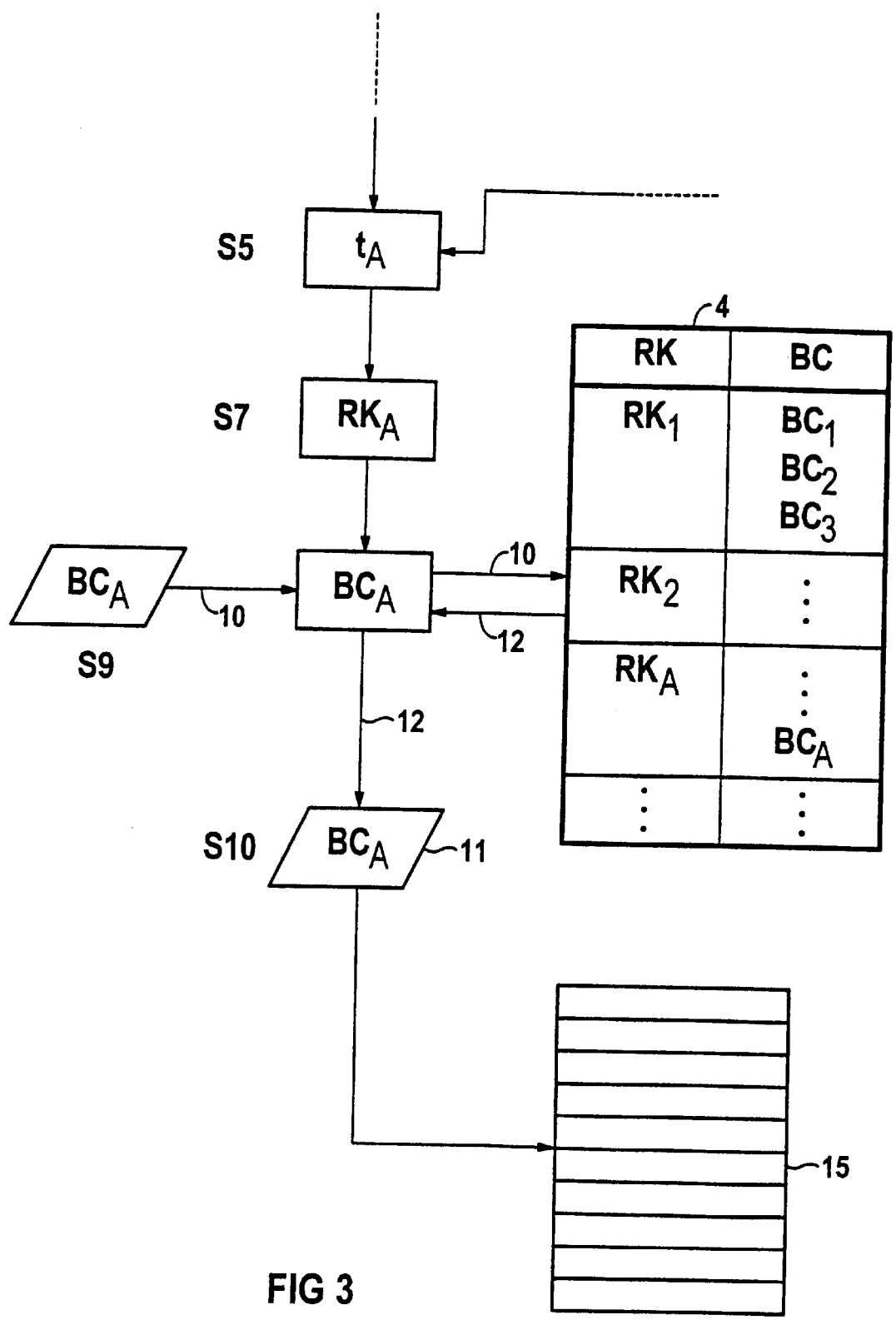
FIG. 3 is a highly simplified flowchart of a method which defines and/or selects a component code, in addition to the method illustrated in FIG. 2.

An example of a method according to the invention which is illustrated in FIG. 3 proceeds, up to the fifth step S5, precisely in the same way as the method illustrated in FIG. 2. In the fifth step S5 according to FIG. 3, the next largest wall thickness $t_A$ of an available pipe component is specified with the aid of the second memory 2. In the method illustrated in FIG. 3, a smallest permitted bending radius $R_{min}$ is not calculated. Instead, the specification of the next largest wall thickness $t_A$ is followed directly by the generation of a pipe class $RK_A$ which is uniquely defined for the line section in a seventh step S7.

Component codes $BC_1$, $BC_2$, . . . are stored and ordered according to pipe classes $RK_1$, $RK_2$, . . . , in a pipe component memory 4. The stored pipe classes $RK_1$, $RK_2$, . . . have been generated from a set of line parameters with the method shown in FIG. 2. Each pipe component is uniquely and definedly assigned at least one pipe class.

After the generation of the pipe class $RK_A$ by analogy with the method illustrated in FIG. 2, two different cases can be distinguished after the seventh step S7:

Case 1, learning mode: if the generated pipe class $RK_A$ in the pipe component memory 4 did not yet exist, it is entered, as a new pipe class, into the pipe component memory 4. A component code $BC_A$ of a pipe component, which is composed of the specified material $W_A$ and which has the specified wall thickness $t_A$, is defined in a ninth step S9 by an external data entry and is assigned to this pipe class $RK_A$. The method operates in this case along sequence arrows designated by reference numeral 10.

Case 2, execution mode: if the generated pipe class $RK_A$ already existed in the pipe component memory 4, a component code $BC_A$ which has been stored under this pipe class $RK_A$ is selected from the pipe component memory 4 in a tenth step S10 and is output on a visual display unit 11. In this case, the method operates along sequence arrows designated by reference numeral 12.

Through the use of the component code $BC_A$ which has been defined or selected, an actually existing pipe component can be unambiguously identified and it is then used to produce or renew the line section which is to be produced or renewed. In the process, the component code $BC_A$ can, as indicated in FIG. 3, be used to actuate an automatic storage facility 15 which outputs or delivers the pipe component after the entry of the component code $BC_A$. However, the component code $BC_A$ can also be used to initiate an ordering procedure if the pipe component is not present in the storage facility.

A line parameter of a line section, for example the maximum permissible pressure $p_A$, may be redefined due to a changed structure, during the operation or the planning of the pipeline system. In that case, the method according to the invention checks uniquely definedly, quickly and reliably whether or not this causes the pipe class for the line section to change. If the pipe class changes, a pipe component which matches the changed structure is then immediately identified, for example with the method example which is given in diagrammatic form in FIG. 3, and installed in the line section. The method according to the invention therefore implements a quasi-dynamic assignment of a pipe class, and/or of a specific pipe component, to a line section.

We claim:

1. A method for at least one of planning, constructing and maintaining a pipeline system having a plurality of line sections, which comprises:

defining line parameters to include a maximum permissible pressure, a maximum permissible temperature and a rated diameter;

assigning a set of the line parameters to each of the plurality of line sections in the pipeline system;

specifying a material and a wall thickness of an available pipe component on the basis of a selected set of the line parameters for a line section to be produced or renewed, which are sufficient for loading in accordance with the selected set of the line parameters;

generating a pipe class uniquely defined for the line section from the specified material and wall thickness; and identifying a sufficiently loadable pipe component for the line section using the pipe class.

2. The method according to claim 1, which comprises:

assigning a strength value and a use priority to at least one material in a first memory;

storing an external diameter and wall thicknesses of available pipe components in a second memory; and on the basis of the selected set of line parameters for the line section to be produced or renewed:

a) specifying the material by selecting a material with the highest use priority and the strength value assigned to that material from the first memory;

b) determining a maximum permissible transversal stress for the material;

c) selecting an external diameter from the second memory;

d) determining a minimum wall thickness from the external diameter and the transversal stress;

e) specifying the wall thickness by determining the next largest wall thickness of an available pipe component from the second memory using the material and the minimum wall thickness; and f) generating the pipe class uniquely defined for the line section from the selected set of line parameters, the material and the next largest wall thickness.

3. The method according to claim 1, which comprises storing component codes for pipe components, ordered according to pipe classes, in a pipe component memory.

4. The method according to claim 3, which comprises generating one of the pipe classes in a uniquely defined manner from at least one set of line parameters, and assigning at least one pipe class to each pipe component.

5. The method according to claim 3, which comprises:

entering the pipe class as a new pipe class in the pipe component memory, if the pipe class having been generated for the selected set of line parameters did not yet exist in the pipe component memory, and defining and assigning to the pipe class a component code of a pipe component composed of the specified material and having the specified wall thickness; and selecting a component code having been stored under the pipe class from the pipe component memory, if the pipe class having been generated for the selected set of line parameters already existed.

6. The method according to claim 5, which comprises using at least one of the selected and defined component code to actuate an automated storage facility containing pipe components.

7. The method according to claim 5, which comprises producing or renewing the line section to be produced or renewed, by using the pipe component associated with at least one of the selected and defined component code.

8. The method according to claim 1, wherein the line parameter sets respectively assigned to the line sections include at least one of a material type and a safety level.

9. The method according to claim 2, which comprises calculating a smallest permitted bending radius for the selected pipe component from the determined minimum wall thickness and from stored minimum wall-thickness comparison values.

10. The method according to claim 1, which comprises displaying at least one of the generated pipe class and the specified wall thickness on a visual display unit.

11. The method according to claim 2, which comprises displaying the specified external diameter on a visual display unit.

12. The method according to claim 9, which comprises displaying the smallest permitted bending radius on a visual display unit.

13. The method according to claim 1, which comprises analyzing a plurality of alternative materials in the generation of the pipe class.

14. The method according to claim 2, which comprises initially selecting a plurality of materials for which a minimum wall thickness is determined in each case, and then selecting and using one of the materials giving rise to the smallest wall thickness, as a basis for a further calculation.

15. The method according to claim 2, which comprises determining the minimum wall thickness $t_{min}$ by using a formula:

$$t_{min} = \frac{p_A \cdot D_A}{2 \cdot \sigma_{perm} \cdot l_f + p_A} + A$$

wherein $p_A$ designates a maximum permissible pressure in the line section to be produced or renewed, and $D_A$, $\sigma_{perm}$, $l_f$ and $A$ designate the external diameter having been specified, the maximum permissible transversal stress having been determined, a longitudinal factor and a sum of tolerances occurring.

16. A data processing system, comprising a calculating unit programmed for carrying out the method according to claim 1.

* * * * *